Patented Oct. 10, 1939

2,175,805

UNITED STATES PATENT OFFICE 2,175,805

STABILIZED ORGANIC NITRILE AND PROCESS OF MAKING

Ralph A. Jacobson, Wilmington, Del., assignor to E. I. du Pont de Nemours & Company, Wilmington, Del., a corporation of Delaware No Drawing. Application June 8, 1937, Serial No. 147,055

6 Claims. (Cl. 202—57)

This invention relates to the preparation of glycolonitrile and more particularly to improvements in its manufacture from formaldehyde and hydrogen cyanide. The invention relates further to treatment of the product for the purpose of preserving it.

Glycolonitrile, also properly called formaldehyde cyanhydrin, is a known compound of the formula:

A number of methods for its preparation are given in the literature, among them the treatment of aqueous formaldehyde with potassium cyanide and sulfuric acid, the treatment of formaldehyde with aqueous hydrogen cyanide, and the treatment of paraformaldehyde or trioxymethylene with hydrogen cyanide in the presence of an alkali. Due to the ease with which glycolonitrile polymerizes, however, the yields obtainable from known processes, such as the above, have been low. In fact, a glycolonitrile prepared in accord with the usual methods polymerizes spontaneously in a few days to a solid product which is useless as an intermediate for the preparation of many compounds and unfitted for many other uses to which the monomeric compound can be put.

An object of the present invention is to provide a process for preparing glycolonitrile, recovering it from the crude reaction product, and keeping it as a stable monomeric liquid for an indefinite period of time. Another object of the invention is to prepare glycolonitrile from formaldehyde and hydrogen cyanide under conditions which prevent its polymerization and give exceptionally high yields of a pure product. Yet another object of the invention is to make available a stabilized glycolonitrile. Other objects of the invention will hereinafter appear.

Briefly stated, the above objects are accomplished by treating aqueous formaldehyde with hydrogen cyanide in the presence of an acidic compound, such as phosphoric acid, sulfuric acid, tartaric acid, phthalic anhydride, and the like, distilling at subatmospheric pressure the product resulting from the reaction and acidifying the distilled glycolonitrile.

I have discovered that if aqueous formaldehyde and hydrogen cyanide are mixed in stoichiometric proportions at 0 to 5° C., and the mixture acidified slightly, warmed at 70–80° C. for several hours and then distilled at subatmospheric pressure, pure glycolonitrile is obtained in excellent yields. I have likewise discovered that, by maintaining the pH of the pure distilled product at less than 7 and preferably at less than 6, the product can be retained unchanged for an indefinite period. If the pH is not kept definitely on the acid side during reaction and distillation, much tar is formed, the yields of glycolonitrile are unsatisfactory, and there is ever present the threat of sudden decomposition. Furthermore, if the pure distilled glycolonitrile is allowed to stand for a few days without acid having been added, it will usually polymerize suddenly and violently with the formation of tar. The presence of an acidic compound during synthesis and purification, and the addition of one to the distilled product, eliminates these difficulties and makes it possible to prepare, distill, and keep the glycolonitrile without change.

The more detailed practice of the invention is illustrated by the following examples, in which parts given are by weight unless otherwise stated. There are, of course, many forms of the invention other than these specific embodiments.

Example I

To 688 parts of 37% aqueous formaldehyde, cooled to 5° C., was added 228 parts of liquid hydrogen cyanide. The mixture was kept at 0 to 5° C. for 4 hours, allowed to stand overnight at about 25° C., acidified with about 2 parts of aqueous 85% o-phosphoric acid and warmed on the steam bath for 4 hours in a flask containing a reflux condenser. The crude reaction product was then distilled in vacuum from a bath maintained at 125° C. Following the removal of the water, the cyanhydrin passed over as a colorless liquid boiling at 95° C. under 12 mm. pressure. The yield was 482 parts or 94.3% of the theoretical. The colorless anhydrous product was stabilized by adding thereto 85% aqueous o-phosphoric acid in the ratio of about 2 parts of acid to 500 parts of glycolonitrile.

Example II

To a mixture of 1177 parts of 37% aqueous formaldehyde and 391 parts of hydrogen cyanide, which had been prepared at 0 to 5° C. and maintained at this temperature for 4 hours, 1.47 parts of tartaric acid was added and the mixture heated for 4 hours in a boiling water bath. The crude reaction product was then subjected to vacuum distillation. Following removal of the water, the glycolonitrile was collected as the fraction boiling at 92° C. under 11 mm. pressure. The yield was 726 parts or 87.8% of the theoretical. The product was stabilized by adding thereto about 2 parts of 85% aqueous o-phosphoric acid per 500 parts of glycolonitrile. Equally good results are obtained if the tartaric acid of the example is replaced by 1.51 parts of 95% sulfuric acid, or by 1.47 parts of phthalic anhydride.

The stabilizing effect of various acids on glycolonitrile is shown by the following experiments. Samples of glycolonitrile containing 0.28% by weight of several different acids were allowed to stand at room temperature alongside samples of pure anhydrous unstabilized glycolonitrile and of glycolonitrile containing 0.28% of aniline and of sodium hydroxide. The results were as follows:

| Added agent | Stability period |
|---|---|
| None | Suddenly decomposed to a tar at the end of 6 days. |
| 0.28% phosphoric acid | Still clear and colorless after 6 mos. |
| 0.28% sulfuric acid | Do. |
| 0.28% hydrochloric acid | Do. |
| 0.28% nitric acid | Do. |
| 0.28% acetic acid | Do. |
| 0.28% formic acid | Do. |
| 0.28% propionic acid | Do. |
| 0.28% phthalic acid | Do. |
| 0.28% boric acid | Do. |
| 0.28% sodium hydroxide | Decomposed violently at the end of 5 hours. |
| 0.28% aniline | Decomposed violently at the end of 12 hours. |

It is apparent from the above data that pure anhydrous glycolonitrile of neutral reaction is unstable and eventually decomposes to a tar. The data also show that the addition of an alkaline-reacting material such as sodium hydroxide reduces the stable period to a matter of a few hours. Even such a weak base as aniline markedly accelerates the decomposition of glycolonitrile, even though present in very small amounts. On the other hand, the presence of a trace of acid renders glycolonitrile completely stable.

Thirty-seven per cent aqueous formaldehyde, commercially designated as formalin, and ordinary commercial hydrogen cyanide may be used satisfactorily in the above designated processes. If desired, however, paraformaldehyde or trioxymethylene can be used in whole or in part. Water or lower aliphatic alcohols and esters, in particular methanol, ethanol, n-propanol, isobutanol, ethyl acetate, and methyl propionate may be used as solvents or diluents. Gaseous formaldehyde can be used in lieu of aqueous formaldehyde by passing it into the hydrogen cyanide in water or a solvent of one of the above types. In the specification and claims "formaldehyde" will include the polymeric or monomeric form of the aldehyde whether in liquid, or vapor phase or in solution.

The proportions of formaldehyde to hydrogen cyanide can be varied over a considerable range such as 2 mols of either reactant to one of the other, but stoichoimetric proportions of the reactants are desirable since no recovery of excess reagent is then necessary.

Considerable latitude in temperature is possible though it is preferable to mix the reagents in the cold because of the low boiling point of liquid hydrogen cyanide. This permits the reaction to proceed slowly without loss of either reagent. Alternatively, however, the hydrogen cyanide can be added above its boiling point (26° C.) by leading it as a vapor into the formaldehyde solution maintained at temperatures of from 20° to 100° C. After the initial reaction has occurred, it is preferable to maintain the mixture at from 70 to 100° C. for four hours, but the same result can be obtained by using longer periods at lower temperatures, or shorter periods at higher temperatures. Temperatures exceeding 100° C. are unnecessary and therefore not to be recommended. The reaction may be carried out under reduced, normal or elevated pressures as desired.

It is desirable to conduct the distillation at a bath temperature of 125° C. or less, necessitating in turn pressures of 12 mm. or less, in order to avoid discoloration and decomposition of the product, which begin to be evident at about 125° C. and increase with increasing temperatures. It is also desirable to heat the distillation vessel indirectly, as through a suitable oil, sand, or metal bath.

It has been found that o-phosphoric, tartaric, phthalic, and sulfuric acids are well adapted for the stabilization of the reaction mixture during the preparation of glycolonitrile and during its subsequent vacuum distillation. These acids are also particularly efficacious for stabilization of the product. However, any stable acidic compound can be used, providing only that it does not volatilize or decompose so readily as to be dissipated during the early part of the distillation and providing, in addition, that it does not decompose the glycolonitrile with consequent dissipation of its own acidic properties. Acid anhydrides such as acetic anhydride, butyric anhydride, propionic anhydride, maleic anhydride and phthalic anhydride as well as inorganic or organic acid salts such as ammonium acid sulfate, ammonium acid sulfite, sodium acid phosphate, sodium acid sulfate, methylamine hydrochloride, anilin hydrochloride, and dimethylamine hydrobromide are also effective stabilizing agents during reaction and distillation, since they impart to the solution a pH of less than 7.0 and preferably less than 6.0. As to the amount of acid or acidic compound required, a fraction of 1% is usually sufficient, i. e., about 0.2 to 0.3% of the combined weight of hydrogen cyanide and formaldehyde calculated on an anhydrous basis. There is no objection to using considerably larger amounts such as in the range of 1 to 5% providing that proper care is used during the end of the distillation to avoid too great a concentration of strong inorganic acids, such as sulfuric acid, from accumulating.

Stabilized glycolonitrile has been found useful for a variety of purposes. It may be used as an intermediate for the preparation of detergents, as a solvent for certain types of resins and plastics, and as an insecticide. However, it is chiefly useful as an intermediate for the preparation of other compounds such as ethanolamine (by reduction), ethylene-diamine (by reduction in ammonia), glycolamide (by partial hydrolysis), glycolic acid (by hydrolysis), glycinenitrile (by amination), glycine (by amination and hydrolysis), and glycine esters (by amination, hydrolysis, and esterification). Esters of glycolonitrile such as the acetate, formate, butyrate, and isobutyrate are useful as solvents and insecticides.

From a consideration of the above specification, it will be appreciated that many changes may be made in the details and proportions therein given without departing from the invention or sacrificing any of the advantages that may be derived therefrom.

I claim:
1. A process of distilling glycolonitrile from an aqueous medium which comprises distilling the glycolonitrile from the aqueous medium at a pH of less than 7.

2. A process of distilling glycolonitrile from an aqueous medium which comprises adding an inorganic acid to the aqueous medium containing the glycolonitrile to lower the pH to less than 6 and subsequently conducting the distillation while maintaining the pH below 6.

3. A process of distilling glycolonitrile from an aqueous medium which comprises adding o-phosphoric acid to the aqueous medium containing the glycolonitrile prior to distillation, to adjust the pH value of the medium to less than 6 and subsequently distilling the glycolonitrile from the medium maintained below a pH of 6.

4. A process which comprises distilling glycolonitrile from an aqueous solution maintained at a pH value of less than 7 and adding to the distillate an acidic compound of such nature and in such amount as to adjust its pH value to less than 7.

5. A process which comprises distilling glycolonitrile from an aqueous solution maintained at a pH value of less than 7 by the addition of o-phosphoric acid and subsequently acidifying the distillate with o-phosphoric acid.

6. A process for the distillation of glycolonitrile which comprises acidifying an aqueous medium containing glycolonitrile with 85% o-phosphoric acid to adjust the pH value of the medium to less than 6, distilling the glycolonitrile from said acidified medium at a pressure of approximately 12 mm. to collect therefrom a condensate comprising a colorless, anhydrous glycolonitrile product and finally acidifying the condensate with o-phosphoric acid.

RALPH A. JACOBSON.